United States Patent [19]

Coker et al.

[11] 4,390,398
[45] Jun. 28, 1983

[54] MODIFIED PROCESS FOR RESIN MANUFACTURING USING A CONTINUOUS SEPARATE DISTILLATION COLUMN

[75] Inventors: Robert J. Coker, Petrolia; Gary W. Bate, Sarnia; Henk J. Deuzeman, Warwick Township, Ontario, all of Canada

[73] Assignee: Fiberglas Canada Limited, Toronto, Canada

[21] Appl. No.: 148,833

[22] Filed: May 12, 1980

Related U.S. Application Data

[62] Division of Ser. No. 870,519, Jan. 18, 1978, Pat. No. 4,233,267.

[30] Foreign Application Priority Data

Jan. 18, 1977 [CA] Canada .................. 269956

[51] Int. Cl.³ .................... B01D 3/14; C08G 63/02
[52] U.S. Cl. .................................... 203/18; 203/74; 203/87; 203/91; 203/DIG. 6; 203/DIG. 22; 422/187; 202/161; 560/79; 560/191; 528/272
[58] Field of Search ............ 203/72, 71, 18, 74, 203/77, 86, 87, 98, 91, 99, 73, DIG. 6, DIG. 16, DIG. 22; 202/153, 176, 155, 159, 161; 422/187; 562/248; 560/79, 191; 528/272

[56] References Cited

U.S. PATENT DOCUMENTS

| | | | |
|---|---|---|---|
| 2,892,812 | 6/1959 | Helbing | 560/89 |
| 2,895,886 | 7/1959 | Schneider | 203/72 |
| 2,905,707 | 9/1959 | Hurt et al. | 560/92 |
| 2,973,341 | 2/1961 | Hippe et al. | 526/65 |
| 3,039,980 | 6/1962 | Mallison | 260/404.8 |
| 3,068,206 | 12/1962 | Nicolson et al. | 526/71 |
| 3,127,376 | 3/1964 | Lindenauer et al. | 526/60 |
| 3,174,830 | 3/1965 | Watzl et al. | 422/135 |
| 3,241,926 | 3/1966 | Parker et al. | 203/DIG. 6 X |
| 3,379,624 | 4/1968 | Lindkrist | 202/176 |
| 3,438,942 | 4/1969 | Scheller | 526/65 |
| 3,470,070 | 9/1969 | Heckart | 203/88 |
| 3,644,096 | 2/1972 | Lewis et al. | 422/197 |
| 3,743,672 | 7/1973 | Kollar | 203/DIG. 6 X |
| 3,803,210 | 4/1974 | Rod et al. | 560/14 |
| 3,809,724 | 5/1974 | Golden | 203/DIG. 6 X |

OTHER PUBLICATIONS

"Report on the Preparation of Isophthalic–Glycol Esters", (pub. Oronite Chem. Co.).

*Primary Examiner*—Wilbur L. Bascomb, Jr.
*Attorney, Agent, or Firm*—Fleit, Jacobson & Cohn

[57] ABSTRACT

Volatile reactants are heated under reflux in a reactor and form volatile reaction by-products which are continuously removed in a vapor effluent from a reflux column and partial condenser. The effluent, which entrains some of the reactants, is condensed in a first total condenser and is fed to a distillation apparatus for separation of the volatile reactants and by-products and return of the separated reactants to the reactor. Before the condensate reaches the distillation apparatus, it is temporarily stored in a receiver from which it is controllably fed to a pre-heater where it is evaporated and then fed as a vapor to the distillation column of the distillation apparatus for separation. The distillation column includes at one end a reboiler which retains the reactants. The other end of the distillation column is coupled to a second total condenser in which the volatile by-products are condensed and withdrawn through a cooler for disposal. The reactants are controllably fed from the reboiler back to the reactor, thereby providing control of the system, which has improved efficiency since the distillation apparatus operates independently of the temperature and pressure conditions in the reactor and of the rate and composition of effluent from the reflux column.

10 Claims, 1 Drawing Figure

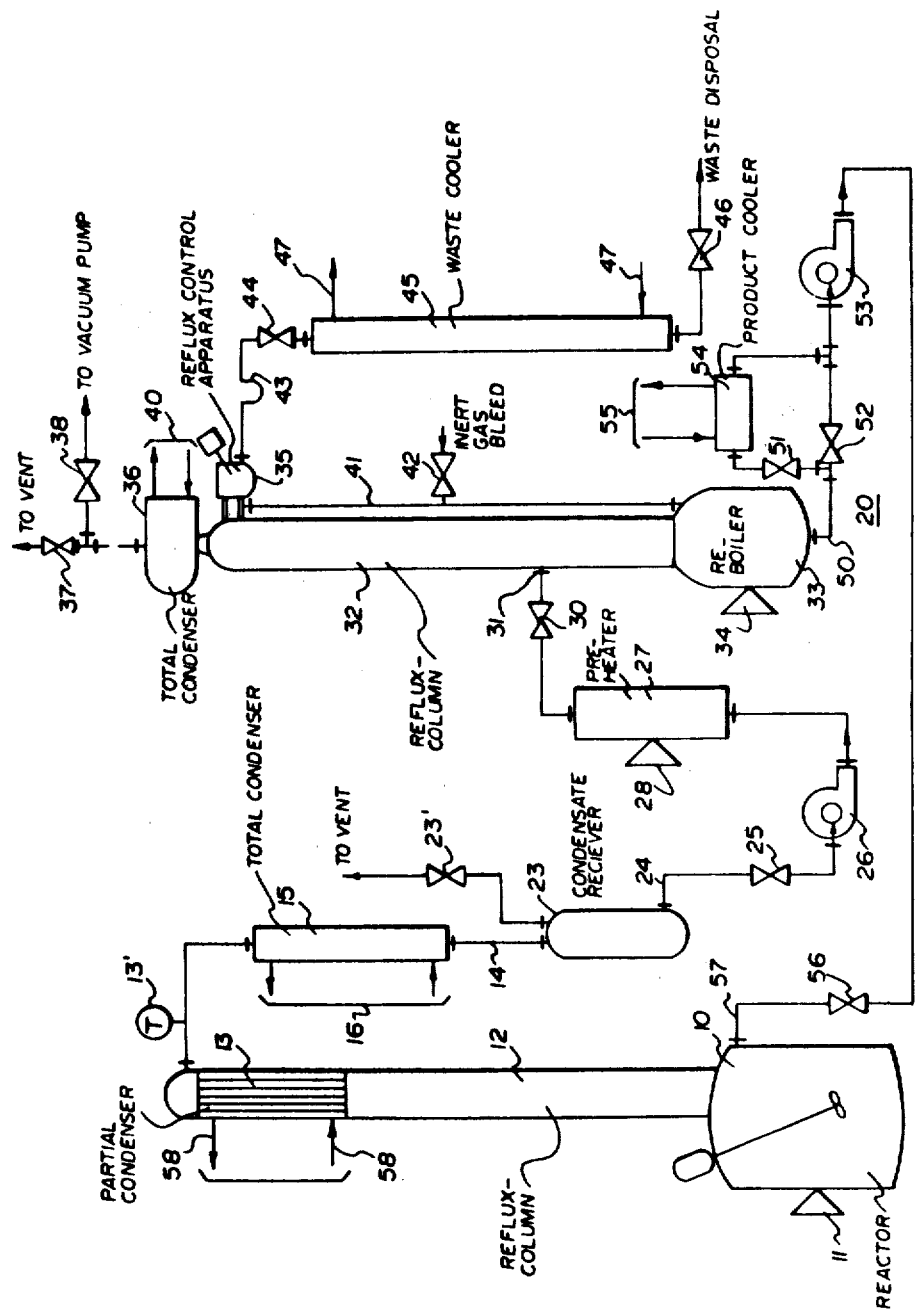

MODIFIED PROCESS FOR RESIN MANUFACTURING USING A CONTINUOUS SEPARATE DISTILLATION COLUMN

This is a divisional of application Ser. No. 870,519 filed Jan. 18, 1978 now U.S. Pat. No. 4,233,267.

This invention relates to distillation apparatus and to its use thereof in combination with a reactor system in which the operating parameters of the distillation apparatus are substantially independent of those of the reactor system.

The production of unsaturated thermoset polyesters, simple ester plasticizers and alkyd resins, involves the use of mono and polyfunctional alcohols including glycols. Various glycols are currently employed in the production of unsaturated thermoset polyesters. In the step of esterification, the glycols are reacted with organic acids or anhydrides and substantial amounts of water are liberated. Since the presence of water in the reaction mixture favours the reverse reaction, and thereby tends to retard the rate of esterification, it is preferable to remove the water as rapidly as possible. However, a problem which is associated with the removal of the water is the simultaneous removal of large amounts of glycol or other volatile reactant which can be boiled off or swept from a reactor as the water is removed.

Techniques are known in the art which permit relatively efficient separation of volatile reactants such as the glycol, and volatile by-products such as the water. In addition, other techniques are known in which the water of reaction is allowed to freely escape from the reactor. As regards the latter, substantially no measures are taken to retain the volatile substances in the reactor. In this case, volatile reactants are added in great excess at the start of the reaction in anticipation of a loss. This method has the drawback that it is not easy to predict what excess to employ because, at certain times, volatile losses are greater or less than anticipated. As a result, the end product is not uniform and reaction times cannot be held within reasonable limits. The cost of the end product is also higher than necessary due to the excess of reactants added at the start. Moreover, the presence of reactants in the by-products may limit their usefulness or impede disposability.

In another known method, an effort is made to retain the volatile reactants by means of a reflux column. A column is installed on top of the reactor in order to obtain heat for its operation. Although this produces an energy saving, it also introduces an attendant drawback which limits the operating temperature range of the reflux column to that of the reactor. A further problem with this method is the difficulty in designing an efficient column since the quantities of total volatile material vary greatly through the reaction period. Since the operation of the column depends on (a) the amount of volatile monomers and by-products travelling through the column and (b) the efficiency of rectification, and since the quantity of volatile material varies, the problems of efficient design are clearly apparent.

Attempts have been made in the prior art to avoid the problems associated with the aforenoted reflux column by employing an improved column that is equipped with a reboiler of its own. The column is not installed on top of the reactor but is vapour fed from the reactor via ducting. In this way, the improved apparatus and its method of operation overcomes some of the difficulties experienced with the column installed on top of the reactor. For example, it allows heat input separate from the reactor, and a better control over retention of the required volatile substances. However, the vapour feed from the reactor governs the quality and quantity of material that has to be handled by the column which still limits efficient design. Efficiency of the column with its own reboiler is therefore limited because of feed variation from flooding to starvation as is experienced with the column that is installed on top of the reactor. Furthermore, the pressures in the reactor and column have to roughly balance. This generally determines the reboiler temperature which, in turn, may not necessarily be optimum for the particular column.

A further problem that may be experienced with the apparatus and methods of the prior art arises from the fact that an azeotropic solution may be formed in the course of the reaction which cannot be separated by distillation at a particular pressure since there is no change in composition on boiling. Although changing the pressure changes the composition of the azeotropic solution, the pressure of the known apparatus cannot be readily changed since it is dependent upon the pressure of the reactor.

The present invention provides distillation apparatus which may be operated substantially independently of the operating parameters of a reactor and its overhead system.

The invention also provides a distillation column that can operate at a maximum efficiency in respect of feed quantity, temperature and pressure.

The invention still further provides the retention of all reactants concurrently with minimization of the production of undesirable products caused by excessive heat degradation.

Another provision of the invention is that control over the reaction is retained by virtue of controllably feeding recovered volatile reactants back to the reactor.

Accordingly, the present invention provides distillation apparatus in communication with a condensate output of a reactor system having a first total condenser adapted to receive and condense a vapour effluent containing volatile by-products and reactants from a reflux column in communication with a reactor, said apparatus having operating parameters which are substantially independent of the operating parameters of the reactor system, the apparatus comprising: condensate receiver means including a condensate inlet coupled to said condensate output for receiving and temporarily storing condensate from said first condenser; distillation column means for separating said by-products and reactants, the column means including a reboiler disposed at a low end thereof and a vapour effluent outlet at the opposite end; and feed pre-heater means having an inlet communicating with an outlet of said receiver means, an evaporator to vaporize the condensate input thereto, and an outlet feed communicating vapourized condensate to a vapour inlet of said column means, whereby the vapourized condensate is continuously separated into volatile by-products at the vapour effluent outlet and volatile reactants in the column means independently of temperature and pressure conditions in the reactor and of the rate and composition of effluent from the reflux column.

A further aspect of the invention relates to a method for continuously separating volatile reactants from volatile by-products of a reaction contained in a condensate output from a total condenser adapted to receive a vapour effluent from a reflux column in communication with a reactor. The method is independent of temperature and pressure conditions in the reactor and of the rate and composition of the effluent, and comprises the steps of:

receiving and temporarily storing the condensate;

heating and continuously vaporizing a predetermined amount of the condensate;

feeding the vaporized condensate to distillation column means having a reboiler disposed at a low end thereof and a vapour effluent outlet at the opposite end; and continuously distilling the vaporized condensate and separating the volatile by-products from the volatile reactants at the vapour effluent outlet of the column means.

The invention will now be more particularly described with reference to an embodiment thereof shown, by way of example, in the accompanying drawing in which the single FIGURE is a diagrammatic representation of the embodiment.

It should be noted that the representations in the drawing are schematic in form since the individual apparatus items are well known in the art and do not require a detailed description. For example, a source of heat 11 for the reactor 10 is shown symbolically whereas in practice a Dowtherm (Trademark) heating system is generally employed.

Referring to the drawing, a reactor 10 is provided which is adapted to receive and cook reagent materials in the production of unsaturated thermoset polyesters, simple ester plasticizers, and alkyd resins. Mounted above the reactor 10, and in vapour communication therewith, is reflux column 12. The uppermost end of the column 12 exhausts a vapour effluent that contains volatile by-products and reactants which are swept up from the reactor 10. The ratio of the vapour effluent exhausted to that condensed and returned to the reactor 10 under reflux is determined by an indirect reflux control system, in which a partial condenser 13 is positioned directly above column 12. Condenser 13 is provided with inlet and outlet lines 58 for a heating medium such as steam, or a cooling medium such as water. Vapour emission and reflux is controlled by a temperature actuated controller 13' installed in a line connecting the partial condenser to a total condenser 15. The partial condenser 13 acts to control reflux during the reaction which requires cooling to control vapour escaping to the total condenser 15 during high water vapour evolution during early stages of the reaction. Later, during lower vapour evolution, a heating medium, such as steam, is desirable to allow vapour to pass through the partial condenser 13 to the total condenser 15. Condensate from the total condenser 15 then flows, under the influence of gravity, through output liquid feed 14 to condensate receiver means 23. Condenser 15 is provided with a pair of cooling lines 16 to provide an input and return for a cooling medium, such as cold water, depending on the characteristics of the particular by-product to be condensed out.

As will be described later in connection with the distillation apparatus which is provided to separate the volatile by-products from the volatile reactants contained in the vapour effluent of the column 12 and condensed out as a condensate by the condenser 15, the by-products and reactants are according to the present invention, continuously separated independently of the temperature and pressure conditions in the reactor 10 and of the rate and composition of effluent from the column 12. This is an important advance in distillation and rectification technology since highly efficient operation of the reactor 10 is achieved.

Referring again to the drawing, the outlet liquid feed 14 is coupled to a condensate receiver means 23 provided with a vent system having a valve 23' permitting closure. The condensate is temporarily stored in the receiver 23 and is taken as required via an outlet conduit 24 through a shutoff valve 25 to an input of a liquid feed pump 26.

The output of the pump 26 feeds a feed pre-heater apparatus 27 which includes an evaporator to vaporize the condensate input thereto. A heat source 28 is employed to provide necessary preheating of the condensate together with evaporation. The outlet of the apparatus 27 leads through a shutoff valve 30 to a vapour inlet 31 of a distillation column 32 in distillation apparatus generally referenced 20.

It will be seen from the foregoing description that the pump 26 supplies a steady regulated feed to the apparatus 27 which, in turn, supplies a corresponding vapour feed to the column 32. Since the apparatus 20 is isolated from the reactor 10 in respect of both temperature and pressure, the column 32 and its overhead system may be run under positive or negative pressure independently of the reactor 10 and its overhead system.

The column 32 forms part of the overhead system of a thermosiphon reboiler 33 in the apparatus 20. It will be observed that the reboiler 33 is provided with a separate heat source 34 which, like heat source 11, usually comprises a Dowtherm (Trademark) heating system in actual practice. The remainder of the overhead system in the apparatus 20 includes a reflux control apparatus 35 and a total condenser 36 together with various ducts which are shown in the drawing. Similar to the condenser 15, the condenser 36 is provided with a vent system as well as a connection to a vacuum pump (not shown) in order to predetermine an operating pressure for both the reboiler 33 and the column 32. Shutoff valves 37 and 38 are shown in respective vent and vacuum ducts to provide apparatus control as required. In addition, the condenser 36 is provided with a pair of cooling lines 40 for conducting a suitable heat transferring substance, such as cold water, depending on the operating conditions to which the condenser 36 is to be set.

As in the case of the column 12, the column 32 provides a vapour effluent which is conducted to the condenser 36. The ratio of the effluent condensed to that returned to the reboiler 33 is controlled by appropriately setting the apparatus 35.

In operation of the reboiler 33, the vapours from the reboiler pass through the column 32 of which predetermined portions are packed usually with pall rings fabricated of type 316 stainless steel. Light vapours, such as water, are condensed in the condenser 36 and are collected in the apparatus 35. The collected water is then drained through an outlet of the apparatus 35 to a conduit forming a liquid seal 43 and therethrough to an input side of a valve 44. The outlet of the valve 44 is conducted to a waste cooler 45. From the cooler 45 the water is conducted through a shutoff valve 46 to a waste disposal (not shown). In the case of condensation reactions, a by-product is water, and relative purity provided by the apparatus 20 permits disposal directly into sanitary sewers rather than other expensive means of disposal. In this regard, it is noted that although the waste water could be disposed of directly without cooling, the cooler 45 is provided, together with input and output lines 47, for entry and exit of coolant in order to comply with local regulations concerning waste disposal and environmental protection.

The heavy fraction of the distillation (i.e. glycol) returns by gravity down through the column packing in stages, during which constant evaporation and condensation of counter current streams of the higher boiling components moving down and the lower boiling components progressing upward occurs.

Line 41 is provided between apparatus 35 and reboiler 33 to allow measurement of differential pressure over the length of the column 32. This, in turn, is used to control the heat input of the reboiler. Line 41, which is provided with a valve 42, is in vapour space at both ends and is kept free from liquid or vapour transmission by a small positive inert gas bleed, provided through valve 42.

An outlet 50 is located in the lowermost portion of the reboiler 33 and may be connected by means of valves 51 and 52 directly to a liquid feed pump 53 when the valve 51 is closed and the valve 52 opened. Alternatively, when the valve 52 is closed and the valve 51 opened, the glycol output of the reboiler 33 may be directed through a product cooler 54 and thence to the input of the pump 53. Input and output lines 55 are shown connected to the cooler 54 to conduct a cooling medium therethrough. The output side of the pump 53 is shown connected through a shutoff valve 56 to a glycol return inlet 57 in the reactor 10.

In light of the foregoing description, it will be apparent that the column 32 of the apparatus 20 may be operated at its maximum efficiency both for feed quantity and for temperature since it is independent of the reactor 10 and its overhead system. In this matter, it is possible to retain all the reactants, and reduce to a minimum the formation of undesirable products by excessive heat degradation. The advantage of feeding the recovered reactants back to the reactor 10 and thereby gaining control over the reaction has also been retained. As previously described, the effluent by-product stream is also relatively free from reactants for use elsewhere. Further, as previously noted, where the by-product is water, its relatively pure condition allows disposal directly into sanitary sewers and avoids recourse to expensive means of disposal.

A further benefit of the apparatus 20 is that the reboiler 33 could also be used to introduce another co-reactant to the reactor 10 using average retention time to form a pre-polymer at a different temperature and/or pressure than that of the reactor 10.

Recommended apparatus sizes for glycol recovery in the case of producing the aforenoted polyesters, plasticizers and resins are not presented herein since scale-up factors for distillation and fractionation methods are known in the art and may be directly applied to the present invention to accommodate any particular conditions, Thus, either smaller or larger systems may be developed depending on required production capacity.

It will be apparent to those skilled in the chemical and engineering arts that the foregoing description of the embodiment of the invention is not restricted solely to producing the aforesaid products, but is also useful in many chemical applications seeking improved product yields and requiring control of a system. The described embodiment should therefore not be taken as a limitation of the invention but merely as an exemplary illustration of the invention.

The embodiments of the invention in which an exclusive property or privilege is claimed are defined as follows:

1. A method of continuously separating volatile reactants from volatile by-products of a batch reaction occurring in a batch reaction zone, said reaction producing a vapor effluent that is refluxed and then condensed to produce a condensate output at variable rates and of variable reactant/by-product mix, said method comprising the steps of:

receiving the condensed output from said batch reaction zone and temporarily storing same;

heating and continuously vaporizing a predetermined amount of said stored condensate; and feeding the vaporized condensate to distillation column means having a reboiler disposed at a low end thereof and a vapor effluent outlet at an opposite high end thereof thereby enabling the further step of:

adjusting temperature and pressure conditions in said distillation column means as a function of said variable reactant/by-product mix for continuously distilling the vaporized condensate fed into said distillation column means and separating the volatile by-products from the volatile reactants at the vapor effluent outlet of said distillation column means independently of the temperature and pressure conditions in said batch reaction zone and independently of the rate of production of said condensate from said batch reaction zone.

2. A method as claimed in claim 1 comprising the further step of condensing the vaporized volatile by-products.

3. A method as claimed in claim 2 comprising the further step of returning to the batch reaction zone a predetermined portion of the content of said reboiler.

4. A method as claimed in claim 3 wherein a volatile by-product of the reaction is water and the volatile reactants include at least one of propylene glycol, ethylene glycol, diethylene glycol, and dipropylene glycol.

5. A method as claimed in claim 4 further comprising operating said column means under a predetermined sub-atmospheric pressure.

6. A method of continuously separating volatile reactants from volatile by-products of a batch reaction in a batch reaction zone which produces condensate output at variable rates and of variable reactant/by-product mix, said batch reaction comprising reacting components in a batch reactor to produce a vapor effluent of said reactants and by-products, passing said effluent from said reactor into a reflux column in communication with the batch reactor, and then into a total condenser for receiving and condensing the vapor effluent including said volatile reactants and by-products to produce said condensate output, said method comprising the steps of:

receiving the condensate directly from said batch reaction zone and temporarily storing same;

heating and continuously vaporizing a predetermined amount of said condensate from said batch reaction zone in feed pre-heater means; and feeding the vaporized condensate to distillation column means having a reboiler disposed at a low end thereof and a vapor effluent outlet at an opposite high end thereby enabling the further step of:

adjusting temperature and pressure conditions in said distillation column means as a function of said variable reactant/by-product mix for continuously distilling the vaporized condensate fed into said distillation column means and separating the volatile by-products from the volatile reactants at the vapor effluent outlet of said distillation column means independently of the temperature and pressure conditions in said batch reaction zone and independently of the rate of production of condensate by said batch reaction zone.

7. A method according to claim 1, further comprising recovering in the reboiler condensed reactants from the vaporized condensate fed to the distillation column means.

8. A method according to claim 6, further comprising recovering in said reboiler condensed reactants from the vaporized condensate fed to the distillation column means.

9. A method according to claim 7, further comprising returning the separated reactant to the batch reaction zone.

10. A method according to claim 8, further comprising returning the recovered reactants to said batch reactor.

* * * * *